United States Patent
Mayer et al.

(10) Patent No.: US 6,268,423 B1
(45) Date of Patent: Jul. 31, 2001

(54) BUILDING COMPOSITIONS WHICH COMPRISE HYDROPHOBICIZING POWDERS COMPRISING ORGANOSILICON COMPOUNDS

(75) Inventors: Hans Mayer; Ingeborg König-Lumer, both of Burghausen; Albert Hausberger, Kienberg; Rudolf Hager, Altötting, all of (DE)

(73) Assignee: Wacker-Chemie GmbH, München (DE)

( * ) Notice: Subject to any disclaimer, the term of this patent is extended or adjusted under 35 U.S.C. 154(b) by 0 days.

(21) Appl. No.: 09/185,681

(22) Filed: Nov. 4, 1998

(30) Foreign Application Priority Data

Nov. 27, 1997 (DE) .............................................. 197 52 659

(51) Int. Cl.⁷ ..................................................... C08K 3/00
(52) U.S. Cl. ........................................... 524/492; 524/493
(58) Field of Search ..................................... 524/492, 493

(56) References Cited

U.S. PATENT DOCUMENTS

| | | |
|---|---|---|
| 4,231,917 | 11/1980 | Zeldin et al. . |
| 4,851,047 * | 7/1989 | Demlehner et al. ................. 106/111 |
| 5,183,710 | 2/1993 | Gerbino . |
| 5,681,892 | 10/1997 | Weidner et al. . |

FOREIGN PATENT DOCUMENTS

| | | |
|---|---|---|
| 108760 | 4/1960 | (AU) . |
| 31 01 754 C2 | 7/1982 | (DE) . |
| 195 25 068 A1 | 1/1997 | (DE) . |
| 195 35 833 A1 | 3/1997 | (DE) . |
| 0 811 584 A1 | 12/1997 | (EP) . |

OTHER PUBLICATIONS

AT208760 describes a building material composition which contains finely dispersed silica, wherein the surface of the silica is covered with an organosiloxane. Derwent Abstract corresponding to DE 31 01 754 A.
Derwent Abstract corresponding to DE 195 35 833.
Patent Abstracts of Japan, vol. 018, No. 410 (C–1232), Aug. 2, 1994 & JP 06 122539A (Shin Etsu Chem. Co. Ltd.).
Patent Abstracts of Japan, vol. 096, No. 004, Apr. 30, 1996 7 JP 07 330411 A (Mitsubishi Chem. Corp.).

* cited by examiner

Primary Examiner—Edward J. Cain
(74) Attorney, Agent, or Firm—Brooks & Kushman P.C.

(57) ABSTRACT

The building compositions comprise hydrophobicizing powders which contain
  A) silica as support material and
  B) a hydrophobicizing component which is liquid at 10° C. and comprises
    B1) one or more organosilicon compound(s) and, if desired,
    B2) solvent and/or
    B3) water and emulsifier,
with the proviso that the powders contain from 5 to 80% by weight of organosilicon compound, based on the total weight of the powder.

25 Claims, No Drawings

BUILDING COMPOSITIONS WHICH COMPRISE HYDROPHOBICIZING POWDERS COMPRISING ORGANOSILICON COMPOUNDS

TECHNICAL FIELD

The invention relates to building compositions which contain hydrophobicizing powders comprising organosilicon compounds.

BACKGROUND ART

Powders which comprise organosilicon compounds and are redispersible in water are known from DE-A-19535833. The powders are based on vinyl acetate copolymers and comprise on their surface not only dispersants but also, as hydrophobicizing agents, organosilicon compounds on water-insoluble support materials. This reduces the blocking tendency while maintaining the redispersibility of the redispersible powders. Blocking impairs the redispersibility and also the storage stability of the redispersible powders. When stored at high atmospheric humidity, such redispersible powders display a tendency toward caking, and do not hydrophobicize building compositions with which they have been mixed.

Powders which comprise organosilicon compounds and are not redispersible in water are known from GS-A-1217813. The powders are produced from lime and an emulsion of organopolysiloxane resin. The lime powders described there are used as hydrophobicizing agents for compositions comprising inorganic binders or consisting of such binders, and also as binders in mortars and renders.

The lime powders easily lead to caking and thickening of the compositions with which they have been mixed. In addition lime acts as a catalyst for reactive organosilicon compounds. Owing to their high alkalinity, the lime powders are only suitable for hydraulically setting compositions comprising lime and/or cement, or for gypsum plaster. The hydrophobicizing action is too low.

DISCLOSURE OF INVENTION

It is an object of the invention to make available building compositions which comprise pulverulent hydrophobicizing agents which do not have a tendency toward caking and can be metered easily.

BEST MODE FOR CARRYING OUT THE INVENTION

The invention provides building compositions which comprise hydrophobicizing powders whose essential components include:
A) silica as support material and
B) a hydrophobicizing component which is liquid at 10° C. and comprises
   B1) organosilicon compound(s) and, if desired,
   B2) solvent(s) and/or
   B3) water and emulsifier,
with the proviso that the powders contain from 5 to 80% by weight of organosilicon compound, based on the total weight of the powder.

The building compositions quickly achieve high water repellency. In contrast to hydrophobicized redispersible dispersion powders, the present hydrophobicizing powders contain no reemulsifiable constituents, and thus the development of the water repellency is quicker and more distinct.

The hydrophobicizing powders are not dispersible and are therefore not coated with dispersants which display a tendency toward caking. The hydrophobicizing powders are free-flowing and do not form lumps even after prolonged storage in air saturated with water vapor.

The sum of (A) silica and organosilicon compound, organic solvent, water and emulsifier of the liquid hydrophobicizing component (B) is preferably at least 90% by weight, in particular at least 95% by weight, of the hydrophobicizing powder.

As support material (A), it is possible to use, for example, pyrogenic silica or precipitated silica. These types of silica are finely divided and preferably have a BET surface area of at least 50 m$^2$/g, in particular at least 100 m$^2$/g.

The organosilicon compounds (B1) present in the hydrophobicizing powders are preferably selected from the group consisting of
(B1.1) $C_1$–$C_{20}$-alkyl-$C_1$–$C_6$-alkoxysilanes,
(B1.2) organosiloxanes containing groups selected from among hydrocarbon, hydroxyl, $C_1$–$C_6$-alkoxy and aminoalkyl groups and
(B1.3) alkali metal siliconates.

Preferably, the $C_1$–$C_{20}$-hydrocarbon-$C_1$–$C_6$-aloxysilanes (B1.1) contain 1 or 2 identical or different, unsubstituted or halogen-substituted, SiC-bonded mono-valent $C_1$–$C_{20}$-hydrocarbon radicals and the other radicals are identical or different $C_1$–$C_6$alkoxy radicals.

Examples of $C_1$–$C_{20}$-hydrocarbon radicals are alkyl radicals such as the methyl, ethyl, n-propyl, iso-propyl, n-butyl, iso-butyl, tert-butyl, n-pentyl, iso-pentyl, neo-pentyl, tert-pentyl radical; hexyl radicals such as the n-hexyl radical; heptyl radicals such as the n-heptyl radical; octyl radicals such as the n-octyl radical and iso-octyl radicals such as the 2,2,4-trimethylpentyl radical; nonyl radicals such as the n-nonyl radical; decyl radicals such as the n-decyl radical and dodecyl radicals such as the n-dodecyl radical; cycloalkyl radicals such as the cyclopentyl, cyclohexyl, 4-ethylcyclohexyl, cycloheptyl, norbornyl and methylcyclohexyl radicals; alkenyl radicals such as the vinyl, allyl, n-5-hexenyl, 4-vinylcyclohexyl and 3-norbornenyl radicals; aryl radicals such as the phenyl, biphenylyl, naphthyl, anthryl and phenanthryl radicals; alkaryl radicals such as o-, m-, p-tolyl radicals, xylyl radicals and ethylphenyl radicals; aralkyl radicals such as the benzyl radical and the α- and β-phenylethyl radicals. Particular preference is given to unsubstituted $C_1$–$C_{12}$-alkyl radicals and the phenyl radical.

Examples of halogen-substituted $C_1$–$C_{20}$-alkyl radicals are fluorine-, chlorine-, bromine- and iodine-substituted alkyl radicals, e.g. the 3,3,3-trifluoro-n-propyl radical, the 2,2,2,2',2',2'-hexafluoroisopropyl radical and the heptafluoroisopropyl radical.

Particular preference is given to unsubstituted $C_1$–$C_{20}$-alkyl radicals and the phenyl radical.

Examples of $C_1$–$C_6$-alkoxy radicals are the methoxy, ethoxy, n-propoxy, isopropoxy, n-butoxy, iso-butoxy, sec-butoxy, tert-butoxy radicals; pentyloxy radicals such as the n-pentyloxy radical and hexyloxy radicals such as the n-hexyloxy radical. The ethoxy radicals are particularly preferred.

The alkoxy radicals may be substituted by halogen atoms, but this is not preferred.

The organosiloxanes (B1.2) are preferably built up of units of the formula (I)

$$R_v Si(OH)_x (OR^1)_y R_z^2 O_{\frac{4-v-x-y-z}{2}} \qquad (I)$$

where
R is a monovalent, unsubstituted or halogen-substituted, SiC-bonded $C_1$–$C_{20}$-hydrocarbon radical, $R^1$ is a hydrogen atom or a monovalent $C_1$–$C_6$-allyl radical, $R^2$ is a monovalent, unsubstituted or halogen-substituted, SiC-bonded aminoalkyl radical having from 1 to 30 carbon atoms, v is 0, 1, 2 or 3, on average from 0.3 to 2.0, x is 0 or 1, on average from 0.0 to 1.0, y is 0, 1, 2 or 3, on average from 0.0 to 1.5 and z is 0, 1, 2 or 3, on average from 0.0 to 0.8, with the proviso that the organosiloxanes (B1.2) have at least one unit of the formula (I) in which the sum of x, y and z is at least 1.

Preferably, the sum of v, x, y and z is on average from 0.01 to 3.0.

Examples of the $C_1$–$C_{20}$-hydrocarbon radicals R are the examples of $C_1$–$C_{20}$-hydrocarbon radicals given above for the $C_1$–$C_{20}$-hydrocarbon-$C_1$–$C_6$-alkoxysilanes (B1.1).

Although not indicated in the above formula, some of the radicals R can be replaced by hydrogen atoms bound directly to silicon atoms. However, this is not preferred.

Examples of the radicals $OR^1$ are the $C_1$–$C_6$-alkoxy radicals mentioned above for $C_1$–$C_{20}$-hydrocarbon-$C_1$–$C_6$-alkoxysilanes (B1.1).

Radical $R^2$ is preferably a radical of the formula (II)

$$R_2^3NR^4-  \qquad (II)$$

where $R^3$ is a hydrogen atom or a monovalent, substituted or unsubstituted $C_1$–$C_{10}$-hydrocarbon radical or $C_1$–$C_{10}$-aminohydrocarbon radical and $R^4$ is a divalent $C_1$–$C_{15}$-hydrocarbon radical.

Examples of radical $R^3$ are the examples of hydrocarbon radicals given for radical R and also amino-substituted hydrocarbon radicals such as aminoalkyl radicals, particular preference being given to the aminoethyl radical. Preferably, at least one hydrogen atom is bound to each nitrogen atom in the radicals of the formula (II).

Radical $R^4$ is preferably a divalent hydrocarbon radical having from 1 to 10 carbon atoms, particularly preferably from 1 to 4 carbon atoms; in particular, it is the n-propylene radical. Examples of radical $R^4$ are the methylene, ethylene, propylene, butylene, cyclohexylene, octadecylene, phenylene and butenylene radicals. All the examples of alkyl radicals $R^1$ also apply for the radical $R^4$.

Preferred examples of radicals $R^2$ are $H_2N(CH_2)_3$—,
$H_2N(CH_2)_2NH(CH_2)_2$—,
$H_2N(CH_2)_2NH(CH_2)_3$—,
$H_2N(CH_2)_2$—,
$H_3CNH(CH_2)_3$—,
$C_2H_5NH(CH_2)_3$—,
$H_3CNH(CH_2)_2$—,
$C_2H_5NH(CH_2)_2$—,
$H_2N(CH_2)_4$—,
$H_2N(CH_2)_5$—,
$H(NHCH_2CH_2)_3$—,
$C_4H_9NH(CH_2)_2NH(CH_2)_2$—,
cyclo-$C_6H_{11}NH(CH_2)_3$—,
cyclo-$C_6H_{11}NH(CH_2)_2$—,
$(CH_3)_2N(CH_2)_3$—,
$(CH_3)_2N(CH_2)_2$—,
$(C_2H_5)_2N(CH_2)_3$— and
$(C_2H_5)_2N(CH_2)_2$—.

Preferred organosiloxanes (B1.2.1) comprising units of the above formula (I) are liquid at 10° C. In these preferred organosiloxanes, v has an average value of from 0.3 to 1.5, in particular from 0.9 to 1.1, x has an average value of from 0.0 to 0.2, y has an average value of from 0.4 to 1.2 and z is 0.

The preferred organosiloxanes (B1.2.1) are, in particular, branched compounds, and have at least one unit of the formula (I) in which the sum of v, x, y and z is 0 or 1. The organosiloxanes (B1.2.1) preferably comprise at least 10 mol %, in particular at least 30 mol %, of units of the formula (I) in which the sum of x, y and z is 0 or 1.

Examples of organosiloxanes (B1.2.1) are those which are obtainable by reaction of methyltrichlorosilane and, if desired, a $C_1$–$C_8$-alkyltrichlorosilane, or phenyltrichlorosilane, with ethanol in water, for example the organopolysiloxanes of the empirical formulae $CH_3Si(OC_2H_5)_{0.8}O_{1.1}$ $C_6H_5Si(OC_2H_5)_{0.72}O_{1.14}$ or $(CH_3)_{0.7}(^{iso}oct)_{0.3}Si(OCH_3)_{1.3}O_{0.85}$.

Organosiloxanes (B1.2.1) preferably have a viscosity of from 5 mm²/s to 50,000 mm²/s, in particular from 10 mm²/s to 5000 mm²/s, at 25° C.

The preferred organosiloxanes (B1.2.2) have the same preferred meanings of v, x, y and z as the organosiloxanes (B1.2.1), but are solid at 10° C., preferably also at 30° C.

In preferred organosiloxanes (B1.2.3) comprising units of the above formula (I), v is on average from 1.6 to 2.0, in particular from 1.9 to 2.0, x is on average from 0.01 to 1.0, y is on average from 0.0 to 0.2 and z is 0.

The organosiloxanes (B1.2.3) preferably contain not more than 5 mol %, in particular not more than 1 mol %, of units of the formula (I) in which the sum of x, y and z is 0 or 1. The organosiloxanes (B1.2.3) are preferably terminated by hydroxyl groups.

Organosiloxanes (B1.2.3) preferably have a viscosity of from 1 mm²/s to 50,000 mm²/s, in particular from 10 mm²/s to 5000 mm²/s, at 25° C.

In preferred organosiloxanes (B1.2.4) comprising units of the above formula (I), v has an average value of from 0.3 to 1.9, in particular from 0.9 to 1.8, x has an average value of from 0.0 to 0.1, y has an average value of from 0.0 to 1.0, in particular from 0.0 to 0.3, and z has an average value of from 0.05 to 1.0, in particular from 0.2 to 0.8.

The preferred organosiloxanes (B1.2.4) are, in particular, branched and have at least one unit of the formula (I) in which the sum of v, x, y and z is 0 or 1. The organosiloxanes (B1.2.4) preferably comprise at least 5 mol %, in particular at least 10 mol %, of units of the formula (I) in which the sum of x, y and z 0 or 1.

The alkali metal siliconates (B1.3) are preferably lithium, sodium or potassium salts. The radicals of the alkali metal siliconates (B1.3) are preferably $C_1$–$C_6$ alkyl or phenyl radicals.

The hydrophobicizing component (B) comprises solvents (B2) if the organosilicon compound (B1) is solid at 10° C. Suitable solvents are water or organic solvents.

Preferred organic solvents (B2) are solvents or solvent mixtures having a boiling point or boiling range of up to 150° C., in particular 120° C., at 0.1 MPa. Examples of such solvents are alcohols such as methanol, ethanol, n-propanol, iso-propanol, n-amyl alcohol, i-amyl alcohol; ethers such as dioxane, tetrahydrofuran, diethyl ether, diisopropyl ether, diethylene glycol dimethyl ether; chlorinated hydrocarbons such as dichloromethane, trichloromethane, tetrachloromethane, 1,2-dichloroethane, trichloroethylene; hydrocarbons such as pentane, n-hexane, hexane isomer mixtures, heptane, octane, naphtha, petroleum ether, benzene, toluene, xylenes; ketones such as acetone, methyl ethyl ketone, diisopropyl ketone, methyl isobutyl ketone (MIBK); esters such as ethyl acetate, butyl acetate, propyl propionate, ethyl butyrate, ethyl isobutyrate; or mixtures of these solvents. Particular preference is given to the alcohols and hydrocarbons.

The proportion of solvent (B2) is preferably not more than 80% by weight, in particular not more than 60% by weight, of the hydrophobicizing component (B) which is liquid at 10° C.

If the hydrophobicizing component (B) which is liquid at 10° C. in the hydrophobicizing powders comprises water and emulsifier (B3), the organosilicon compound (B1) is present in the form of an aqueous emulsion. Emulsifiers known per se can be used.

Particularly Suitable Anionic Emulsifiers are
1. Alkyl sulfates, particularly those having a chain length of from 8 to 18 carbon atoms, alkyl and alkaryl ether sulfates having from 8 to 18 carbon atoms in the hydrophobic radical and from 1 to 40 ethylene oxide (EO) or propylene oxide (PO) units.
2. Sulfonates, particularly allylsulfonates having from 8 to 18 carbon atoms, alkylarylsulfonates having from 8 to 18 carbon atoms, taurides, esters and monoesters of sulfosuccinic acid with monohydric alcohols or alkylphenols having from 4 to 15 carbon atoms. If desired, these alcohols or alkylphenols may also be ethoxylated with from 1 to 40 EO units.
3. Alkali metal and ammonium salts of carboxylic acids having from 8 to 20 carbon atoms in the alkyl, aryl, alkaryl or aralkyl radical.
4. Partial esters of phosphoric acid and their alkali metal and ammonium salts, particularly alkyl and alkaryl phosphates having from 8 to 20 carbon atoms in the organic radical, alkyl ether phoshates or alkaryl ether phosphates having from 8 to 20 carbon atoms in the alkyl or alkaryl radical and from 1 to 40 EO units.

Particularly Suitable Nonionic Emulsifiers are
5. Polyvinyl alcohol still containing from 5 to 50%, preferably from 8 to 20%, of vinyl acetate units and having a degree of polymerization of from 500 to 3000.
6. Alkyl polyglycol ethers, preferably those having from 8 to 40 EO units and alkyl radicals with from 8 to 20 carbon atoms.
7. Alkaryl polyglycol ethers, preferably those having from 8 to 40 EO units and from 8 to 20 carbon atoms in the alkyl and aryl radicals.
8. Ethylene oxide-propylene oxide (EO/PO) block copolymers, preferably those having from 8 to 40 EO or PO units.
9. Addition products of alkylamines having alkyl radicals containing from 8 to 22 carbon atoms with ethylene oxide or propylene oxide.
10. Fatty acids having from 6 to 24 carbon atoms.
11. Alkyl polyglycosides of the formula R*—O—$Z_o$, where R* is a linear or branched, saturated or unsaturated alkyl radical having on average 8–24 carbon atoms and $Z_o$ is an oligoglycoside radical comprising on average o=1–10 hexose or pentose units or mixtures thereof.
12. Natural products and their derivatives, e.g. lecithin, lanolin, saponins, cellulose; cellulose alkyl ethers and carboxyalkylcelluloses whose alkyl groups each have up to 4 carbon atoms.
13. Linear organo(poly)siloxanes containing polar groups, in particular those containing alkoxy groups having up to 24 carbon atoms and/or up to 40 EO and/or PO groups.

Particularly Suitable Cationic Emulsifiers are
14. Salts of primary, secondary and tertiary fatty amines having from 8 to 24 carbon atoms with acetic acid, sulfuric acid, hydrochloric acid and phosphoric acids.
15. Quaternary alkylammonium and alkylbenzeneammonium salts, in particular those whose alkyl group has from 6 to 24 carbon atoms, in particular the halides, sulfates, phosphates and acetates.
16. Alkylpyridinium, alkylimidazolinium and alkyloxazolinium salts, in particular those whose alkyl chain has up to 18 carbon atoms, particularly the halides, sulfates, phosphates and acetates.

Particularly Suitable Ampholytic Emulsifiers are
17. Amino acids substituted by long-chain groups, e. g. N-alkyldi(aminoethyl)glycine or salts of N-alkyl-2-aminopropionic acid.
18. Betaines such as N-(3-acylamidopropyl)-N,N-dimethylammonium salts having a $C_8$–$C_{18}$-acyl radical and alkylimidazolium betaines.

Preferred emulsifiers are nonionic emulsifiers, in particular the alkyl polyglycol ethers mentioned above under 6., addition products of alkylamines with ethylene oxide or propylene oxide mentioned above under 9., and the alkyl polyglycosides mentioned above under 11.

The amount of organosilicon compound (B1) in the aqueous emulsions is preferably from 1 to 80% by weight, in particular from 5 to 75% by weight.

The proportion of the emulsifier is preferably from 0.1 to 30% by weight, in particular from 0.5 to 5% by weight, of the hydrophobicizing component (B) which is liquid at 10° C.

The powders preferably contain at least 10% by weight, in particular at least 20% by weight, and not more than 70% by weight of organosilicon compound, based on the total weight of the powder.

The hydrophobicizing powder is produced by mixing the hydrophobicizing component (B) which is liquid at 10° C. with silica as support material. Mixing can be carried out in a very simple manner by initially charging the support material, adding component (B) and shaking.

The liquid hydrophobicizing component (B) can be applied to the support material in any apparatus suitable for powder mixtures; here, high shear forces frequently have an adverse effect. Examples are continuously or discontinuously operating ribbon mixers, double helix mixers, blade mixers, ploughshare mixers and fast- or slow-running paddle mixers and also vortex screw mixers and pan mixers. Mixers having rotating mixing vessels can also be used, for example Rhön-wheel mixers, tumble mixers, double cone mixers and V mixers. Mixing is generally carried out at room temperature. However, in some cases it is advantageous to carry out mixing at elevated temperatures. For example, this is advantageous if the viscosity of the liquid hydrophobicizing component (B) at room temperature is too high for uniform incorporation.

In general, it is advantageous to place the support material in the mixer and to add the liquid hydrophobicizing component (B), possibly even to spray it on. Naturally, mixing can also be carried out continuously.

The building compositions can be, in particular, coating compositions or mineral building mixtures for producing mineral building components. The coating compositions are used, in particular, for mineral substrates, and can be purely solvent-based, aqueous, or in the form of powder.

Examples of coating compositions are paints such as mineral paints, lime paints, silicate paints, emulsion paints, emulsion lime paints, emulsion silicate paints and primers; plasters and renders such as mineral plasters and renders and silicate plasters and renders; high-filler coatings based on emulsions, filler-paints, reinforcing compositions, knifing fillers and tile adhesives, and also mortars such as jointing mortar.

Mineral building mixtures include all raw mixtures which can be used for producing mineral building components which are in turn required for the construction of buildings and are part of the buildings, in particular if they are exposed to weathering or require other water-repellent protection.

Examples of building components are factory-produced bricks and concrete roofing tiles, fibro-cement and gypsum boards and also other prefabricated components and insulation components.

Mineral building mixtures can comprise concrete, gypsum plaster, lime, cement, and clay minerals, as well as calcareous sandstone, lightweight concrete, brick or fiber-containing building mixtures whose fibers may be natural or synthetic. Suitable natural fibers are mineral fibers such as rock wool, quartz or ceramic fibers or plant fibers such as cellulose. Suitable synthetic fibers are, for example, glass fibers, polymer fibers and carbon fibers. Particular preference is given to using the silicone powders for hydrophobicizing cement-bonded cellulose fiber components. The cellulose fibers can be, for example, jute, coconut or hemp fibers, or may originate from paper, cardboard or waste paper.

The building compositions preferably contain the hydrophobicizing in powders in amounts of from 0.01 to 80% by weight.

If the hydrophobicizing powders are present in the coating compositions as hydrophobicizing binder, they are added in amounts of at least 1% by weight, in particular at least 2% by weight. The powders used as hydrophobicizing binder preferably comprise an organosilicon compound selected from organosiloxanes (B1.2.1), (B1.2.2) and (B1.2.4), in particular from (B1.1) $C_1$–$C_{20}$alkyl-C-$C_1$–$C_6$-alkoxysilanes and organosiloxanes (B1.2.1).

In the case of coating compositions in which the hydrophobicizing powders are present as hydrophobicizing binder, the binding action commences earlier after application to the substrate than is the case for coating compositions in which the hydrophobicizing binder is the same organosilicon compound in the form of a solution in an organic solvent, emulsion, dispersion or a redispersible powder. For example, the coatings produced using a hydrophobicizing powder become abrasion-resistant considerably more quickly.

Preferred examples of coating compositions in which the hydrophobicizing powders are present as hydrophobicizing binder comprise organic polymer, fillers and auxiliaries in addition to the hydrophobicizing powder. For example, the coating compositions are then silicone resin coating systems such as silicone resin paints and silicone resin renders for whose production silicone resin emulsions or redispersible silicone resin powders have been used in the past. The latter can be used for formulating paste-like silicone resin paints and silicone resin renders or for formulating pulverulent silicone resin coating systems. For the purposes of the present invention, paste-like coating systems are aqueous, ready-to-spread coating materials including pulverulent coating systems, for example powder paints and dry renders. Silicone resin coating systems are described, for example, in DE-A-19525068.

If the hydrophobicizing powders are present as hydrophobicizing agent in the building compositions, they are added in amounts of at least 0.01% by weight, in particular at least 0.1% by weight, and preferably not more than 10% by weight, in particular not more than 1% by weight. The building compositions can then be coating compositions or preferably mineral building mixtures. The building materials produced from the mineral building mixtures have a high water repellency.

The coating compositions can be applied to all substrates to which previously known coating systems have been applied in the past. Thus, the coating compositions are suitable for mineral substrates, metal, wood and plastic. The substrates are preferably mineral substrates such as concrete, natural stone, plasters and renders, sand-lime brick, gypsum plaster and fibro-cement, in particular concrete, natural stone, plaster or render and fibro-cement. The coating compositions can be applied to the respective substrates in any previously known manner, for example by painting, rolling, spraying and dipping, with preference being given to painting and rolling. Preferably, the coating composition is applied to the respective substrate at a temperature of from 5 to 50° C. and the pressure of the surrounding atmosphere and is allowed to dry under the same conditions.

The coating compositions can be produced in a relatively simple way and can, particularly in comparison to silicate paints and film-forming emulsion paints, be used universally, i.e. for all mineral substrates. The coating compositions hydrophobicize the surfaces treated therewith, i.e. they make the surfaces repel liquid water such as rain water, while at the same time the coating has a high permeability to carbon dioxide and water vapor.

Furthermore, the coating compositions have the advantage that coatings produced therewith have a high stability, in particular weathering resistance. In addition, the coatings have no tendency, or only a low tendency, to soiling. Many coatings also repel graffiti.

Further applications for the present building compositions are agents which are introduced into the masonry wall through holes in order to provide a barrier against rising moisture in the wall, or agents for providing a barrier against other undesired water migration, agents for repelling water from finely divided inorganic materials such as perlite, vermiculite or fillers or agents for making thermal insulation materials water-repellent.

When the hydrophobicizing powders are used in the present building compositions, the quick development of water-repellency is notable. The omission of reemulsifiable constituents in the hydrophobicizing powders, in contrast to, for example, hydrophobicized redispersible dispersion powders, results in the development of the water-repellency being quicker and more distinct.

The building compositions are produced by mixing the customary constituents of the compositions with the hydrophobicizing powder. Since the hydrophobicizing powder is free-flowing and free of lumps, homogeneous mixing is achieved very easily using customary mixing equipment. Since the hydrophobicizing powders can be metered in like fillers, it is simple to meter them in automatically.

In the following examples, all parts and percentages are by weight unless indicated otherwise. Unless indicated otherwise, the following examples are carried out at the pressure of the surrounding atmosphere, i.e. at about 1000 hPa, and at room temperature, i.e. at about 20° C. All the viscosities indicated in the examples are based on a temperature of 25° C.

The capillary water absorption ($w_{24}$ value) is determined in accordance with DIN 52617 (Deutsche Industrie Norm). In this test, a sand-lime brick test specimen (Vollstein KS DF) having dimensions of 11.5 cm×11.5 cm×2.5 cm and a density of 2.0 g/cm³ is coated twice with the respective coating composition, allowing 24 hours between coats. The test specimen is subsequently stored for 24 hours at room temperature, 72 hours in a convection drying oven at 50° C. and for 48 hours at room temperature. The test specimen is then irrigated for 3 days, in each case for 8 hours in flowing water, with the surface to be tested being supported on a grid and the immersion depth of the test specimen being 1 cm. The test specimen is subsequently dried at 50° C. for 72 hours in a convection drying oven and then for 72 hours at room temperature and is then weighed. The test specimen is then laid with its coated side downward on a piece of flexible foam which is saturated with water and lying in a pan. The weight of the test specimen presses sufficient water from the foam so that the specimen is continually in contact with water and can absorb it. The foam has to be kept saturated with water for the entire test time. After 24 hours of storage on the sponge, the specimen is taken out and weighed. The $w_{24}$ value is calculated, at an area of $(11.5 \times 11.5)$ cm² according to the following formula:

$$w_{24} \text{ value} = \frac{\text{Amount of water absorbed/area in kg/m}^2}{(24 \text{ hours})^{1/2}}$$

The permeability to water vapor (WDDU, sd value) is determined in accordance with DIN 52615. In this test, a polyethylene frit is coated twice with the respective coating composition (wet layer thickness: about 400 g/m²), allowing 24 hours between coats. It is subsequently stored for 14 days at 23° C. and 50% relative humidity. The coated frit is then placed, in such a way that vapor cannot leak in at the sides, on a 500 ml polyethylene container in which 200 g of a saturated ammonium dihydrogen phosphate solution is present. The average weight loss per 24 hours is calculated from the initial weight and the weight loss after 24, 48 and 72 hours' storage at 23° C. and 50% relative humidity. The sd value, which is characteristic of the permeability to water vapor, is then calculated according to the following formula:

$$sd \text{ value} = \frac{\text{Constant}}{\text{Weight loss in g/m}^2 \text{ of measurement area over 24 hours}}$$

To determine the chalking, a piece of cardboard is coated with the respective coating composition (about 200 μm wet layer thickness). After storage for one week at room temperature, a drop of water is placed on the coating. The drop of water is subsequently spread over the coating by rubbing with a finger (20 times). The water is then allowed to run from the coated cardboard and the turbidity of the water which has run off is assessed visually.

Assessment: clear water means no chalking slightly turbid water means slight chalking turbid, milky water means a high degree of chalking.

The abrasion resistance is tested in accordance with DIN 53778. In this test, the respective coating is applied to a Leneta® sheet by means of a film spreading device so that a dry film thickness of about 100 μm results after storage for 28 days at 23° C. and 50% relative humidity. The dried coating is subsequently scoured with a scouring brush in a scouring apparatus (Gardner model M 105-A abrasion test) under defined conditions. In this test, the number of scouring cycles until the substrate, i.e. the Leneta® sheet, is clearly exposed is determined.

Production of the Hydrophobicizing Powders 100 g of the support material were placed in a normal kitchen mixer and the liquid was added dropwise at room temperature over a period of about 5 minutes. Stirring speed: setting 1. After stirring for another 5 minutes, the pulverulent mixture was taken out and was ready for use.

It is notable that the hydrophobicizing powders remain very free-flowing flowing even after storage for 6 weeks in a desiccator at 100% humidity.

The Following Hydrophobicizing Powders were Produced

I. Hydrophobicizing Component (B) Which is Liquid at 10° C. is a liquid organosilicon compound (B1) or a liquid mixture of organosilicon compounds Silicone powder Ia
　Support material: 100 g of silica I
　Component (B): 100 g of a mixture of i-octyltriethoxysilane and siloxane α in a weight ratio of 20:80

Silicone powder Ib
　Support material: 100 g of silica I
　Component (B): 100 g of i-octyltriethoxysilane Silicone powder Ic
　Support material: 100 g of silica I
　Component (B): 100 g of siloxane α

Silicone powder Id
　Support material: 100 g of silica I
　Component (B): 100 g of a mixture of siloxane β and siloxane γ in a weight ratio of 50:50

Silicone powder Ie
　Support material: 100 g of silica I
　Component (B): 100 g of a mixture of siloxane δ, siloxane α and i-octyltriethoxysilane in a weight ratio of 68:22:10

Silicone powder If
　Support material: 100 g of silica I
　Component (B): 100 g of siloxane γ

Silicone powder Ig
　Support material: 100 g of silica I
　Component (B): 100 g of siloxane δ

Silicone powder Ih
　Support material: 100 g of silica III
　Component (B): 100 g of siloxane φ

II. Hydrophobicizing Component (B) Which is Liquid at 10° C. Comprises Water and Optional Emulsifier Silicone powder IIa
　Support material: 100 g of silica II
　Component (B): 100 g of potassium methylsiliconate, 42% strength in water Silicone powder IIb
　Support material: 100 g of silica II
　Component (B): 100 g of an emulsion of which 67.6 g are prepared by mixing 1.6 g of a reaction product of stearylamine and ethylene oxide having an alkali number of from 48 to 51 mg KOH/g; 1.6 g of an isotridecyl alcohol glycol ether having 10 ethylene oxide units, 80% strength in water; 34 g of a condensation product of an α, ω-dihydroxymethylpolysiloxane having an Si-bonded hydroxyl group in each of the terminal units; N-(2-aminoethyl)-3-aminopropyltrimethoxysilane in the presence of KOH having an amine number of about 0.3, a viscosity of about 1500 mm$^2$/s at 25° C. and a residual methoxy content of less than 5 mol %, based on the methoxy groups initially present in the N-(2-aminoethyl)-3-aminopropyltrimethoxysilane, and 30.4 g of water.

Silicone powder IIc
  Support material: 100 g of silica II
  Component (B): 100 g of an emulsion of 50 g of a mixture of siloxane δ, siloxane α, i-octyltriethoxysilane in a weight ratio of 68:22:10, 2.0 g of polyvinyl alcohol containing 20% of vinyl acetate units and having a degree of polymerization of 2000, and 48 g of water.

Silicone powder IId
  Support material: 100 g of silica II
  Component (B): 100 g of an emulsion prepared by mixing 1.6 g of a reaction product of stearylamine and ethylene oxide having an alkali number of from 48 to 51 mg KOH/g; 1.6 g of an isotridecyl alcohol glycol ether having 10 ethylene oxide units, 80% strength in water; 34 g of a condensation product of an α,ω-dihydroxymethylpolysiloxane having an Si-bonded hydroxyl group in each of the terminal units; 50 g of i-octyltriethoxysilane and 46.8 g of water.

III. Hydrophobicizing Component (B) Which is Liquid at 10° C., Containing Organic Solvent Silicone powder IIIa
  Support material: 100 g of silica II
  Component (B): 100 g of a 50% strength solution of siloxane α in petroleum spirit Silicone powder IIIb
  Support material: 100 g of silica II
  Component (B): 100 g of a 50% strength solution of siloxane α in petroleum spirit Silicone powder IIIc
  Support material: 100 g of silica II
  Component (B): 100 g of a 50% strength solution of i-octyltriethoxysilane in petroleum spirit These Compositions are Prepared Using the Constituents Described in More Detail Below Silica I
Precipitated silica having a BET surface area of 170 m$^2$/g, mean size of the agglomerates=15 μm, 98% SiO$_2$.

Silica II
Precipitated silica having a BET surface area of 190 m$^2$/g, mean size of the agglomerates=100 μm, 98% SiO$_2$.

Silica III
Precipitated silica having a BET surface area of 450 m$^2$/g, mean size of the agglomerates=50 μm, 98.5% SiO$_2$.

Siloxane α
Organopolysiloxane of the formula CH$_3$Si(OC$_2$H$_5$)$_{0.8}$O$_{1.1}$ having an average molecular weight of about 600 g/mol and a viscosity of 20 mm$^2$/s.

Siloxane β
Methylsilicone resin containing about 20 mol % of dimethyl-Si units, molecular weight about 5000, ethoxy-Si content about 10 mol %, high-viscosity liquid having a viscosity of about 80,000 mPas.

Siloxane γ
Dimethylpolysiloxane having an Si-bonded hydroxyl group in each of the terminal units and an average molecular weight of about 4000 g/mol.

Siloxane δ
Methylsilicone resin containing about 10 mol % of dimethylsiloxane units, molecular weight about 5000, ethoxy-Si content about 6 mol %, high-viscosity liquid having a viscosity of about 100,000 mPas.

Siloxane ε
Methylsilicone resin containing about 3 mol % of dimethyl-Si units, molecular weight about 5000, ethoxy-Si content about 4 mol %, pulverulent solid resin having a softening point of about 50° C.

Siloxane φ
Preparation:
  In a 1 l three-necked flask fitted with stirrer, dropping funnel and reflux condenser, 150 g of N-(2-aminoethyl)-3-aminopropyltrimethoxysilane are added while stirring to a mixture of 0.2 g of KOH in 4 g of methanol and 500 g of a dimethylpolysiloxane having an Si-bonded hydroxyl group in each of the terminal units and an average molecular weight of about 4000 g/mol and the mixture thus obtained is refluxed for 6 hours; it is then cooled to 30° C. and mixed with 2.5 ml of 10% strength hydrochloric acid. The methanol is finally distilled off by heating to up to 140° C. and the resulting organopolysiloxane is freed of KCl by filtration. The organopolysiloxane contains 2.9% of basic nitrogen, based on its weight. 40 g of the above organopolysiloxane containing basic nitrogen are mixed with 160 g of i-octyltriethoxysilane and 5 g of propionic acid and heated at 120° C. for 2 hours, forming a slightly yellowish, clear mixture which is homogeneously miscible with water.

Production of Paste-like Silicone Resin Paints

EXAMPLE 1

A paste-like silicone resin paint A is produced by mixing the following starting materials in the order indicated by means of a high-speed laboratory mixer:

341 parts of water
1 part of pigment dispersant (commercially available as "Pigmentverteiler A" from BASF AG, Ludwigshafen)
2 parts of fungicide (commercially available as "Parmetol® DF 19" from Schülke & Mayr, D-Norderstedt)
5 parts of cellulose thickener (commercially available as "Tylose® H 6000 xp", Hoechst AG, Frankfurt)
120 parts of titanium dioxide
275 parts of calcium carbonate
60 parts of talc
100 parts of silicone powder Ia
1 part of 25% strength aqueous ammonia solution and
95 parts of polymer dispersion (commercially available as "Acronal®290 D" from BASF AG, Ludwigshafen)

Further paste-like silicone resin paints B, C, D and E are produced using a method similar to silicone resin paint A, except that 100 parts of silicone powder Ic, Id, Ie or Ig, respectively, are used in place of 100 parts of silicone powder Ia.

The silicone resin paints are subsequently tested in respect of their capillary water absorption (w$_{24}$ value), their permeability to water vapor (sd value) and their chalking, abrasion and weathering behavior. The results are shown in Table 1.

A paste-like silicone resin paint V which is not according to the invention is produced as described in Example 1 using a method similar to that for silicone resin paint A, except that 100 parts of silicone emulsion EM are used in place of 100 parts of silicone powder Ia and 325 parts of calcium carbonate are used in place of 275 parts of calcium carbonate. Silicone emulsion EM comprises 50 parts by weight of a mixture of i-octyltriethoxysilane and siloxane α in a weight ratio of 20:80.

TABLE 1

| Silicone resin paint | Silicone powder | $W_{24}$ value [kg/m²h$^{0.5}$] | sd value [m] | Chalking | Abrasion value, 4 days' storage | Abrasion value, 28 days' storage | Weathering[1] |
|---|---|---|---|---|---|---|---|
| A | I a | 0.09 | 0.02 | slight | 1500 | >10,000 | No cracks |
| B | I c | 0.10 | 0.02 | slight | 1600 | | No cracks |
| C | I d | 0.05 | 0.08 | slight | 1000 | | No cracks |
| D | I e | 0.06 | 0.09 | slight | 2000 | | No cracks |
| E | I g | 0.07 | 0.09 | slight | 2200 | | No cracks |
| V | — | 0.07 | 0.05 | slight | 400 | >10,000 | No cracks |

[1]Accelerated weathering: 1000 hours Q-UV-B

Comparison of the silicone resin paints A and V indicated the following:
1. The silicone powder Ia makes it possible to produce, using the same active ingredient and the same amount of active ingredient, a high-quality silicone resin paint as is otherwise described only for silicone resin emulsions. The term "high-quality" is based on the properties $w_{24}$ value (less than 0.1), sd value (less than 0.1), slight chalking, relative high abrasion resistance in the quick 4-day abrasion test, very high abrasion resistance after storage for 28 days in accordance with DIN, weathering (no cracks).
2. Compared to emulsion EM in the silicone resin paint formulation from Example 1, the use of silicone powder Ia gives earlier abrasion resistance.

Comparative Example 1

Paste-like silicone resin paints are produced as described in Example 1, except that 100 parts of silicone powder Ia are replaced in a 1st experiment by 100 parts of silicone powder Ib (silicone resin paint V1F) and in a 2nd experiment by 100 parts of silicone powder If (silicone resin paint V1G).

The silicone resin paints obtained in this way are subsequently examined as in Example 1. The results are shown in Table 2.

TABLE 2

| Silicone resin paint | Silicone powder | $w_{24}$ value [kg/m²h$^{0.5}$] | sd value [m] | Chalking | Abrasion value, 4 days' storage | Weathering[1] |
|---|---|---|---|---|---|---|
| V1F | I b | 0.07 | 0.08 | very high | 100 | flaked off |
| V1G | I f | 0.06 | 0.08 | very high | 120 | flaked off |

Comparative Example 1 shows that pure silane powders and pure polydimethylsiloxane powders have good hydrophobicizing properties but poor binding properties.

EXAMPLE 2

A paste-like silicone resin paint H is produced as described in Example 1, except that 200 parts of silicone powder IIc are used in place of 100 parts of silicone powder Ia, and therefore only 225 parts of calcium carbonate and 291 parts of water are used. The silicone resin paint H obtained is subsequently examined as described in Example 1. The results are shown in Table 3.

EXAMPLE 3

A paste-like silicone resin paint J is produced as described in Example 1, but 200 parts of silicone powder If IIIb are used in place of 100 parts of silicone powder Ia, and therefore only 225 parts of calcium carbonate and 291 parts of water are used.

The silicone resin paint J obtained is subsequently examined as described in Example 1. The results are shown in Table 3.

TABLE 3

| Silicone resin paint | Silicone powder | $w_{24}$ value [kg/m²h$^{0.5}$] | sd value [m] | Chalking | Abrasion value, 4 days' storage | Weathering[1] |
|---|---|---|---|---|---|---|
| H | II c | 0.08 | 0.09 | slight | 1500 | no cracks |
| J | III b | 0.07 | 0.08 | slight | 1700 | no cracks |

[1]Accelerated weathering: 1000 hours Q-UV-B

Production of a Silicone Resin Powder Coating Composition

EXAMPLE 4

A silicone resin powder coating composition K is produced by intensively mixing the following starting materials in the order indicated. 150 parts of dispersion powder (commercially available as "Vinnapas Dispersionspulver RI 551 Z", Wacker-Chemie GmbH, Burghausen)
250 parts of silicone powder Ic
200 parts of titanium dioxide
1 part of cellulose thickener (commercially available as "Tylose® H 6000 xp", Hoechst AG, Frankfurt)
25 parts of aluminum silicate
5 parts of emulsifier (commercially available as "Polyox® WSR 205", Union Carbide, Düsseldorf)
15 parts of hexanediol and
354 parts of calcium carbonate
This mixture is then dispersed in 500 parts of water by means of a high-speed laboratory mixer. The coating composition obtained is subsequently tested in respect of its capillary water absorption and its abrasion resistance. The results are shown in Table 4.

TABLE 4

| Powder coating Composition | Silicone powder | $w_{24}$ value $[kg/m^2h^{0.5}]$ | Abrasion value, 4 days' storage |
|---|---|---|---|
| K | I c | 0.09 | 1400 |
| V2 | III c | 0.09 | 100 |

Comparative Example 2

A powder coating composition V2 is produced as described in Example 4, except that 150 parts of the silicone powder IIIc are used in place of 150 parts of the silicone powder Ic. The coating composition is subsequently examined as described in Example 4. The results are shown in Table 4.

Production of a Silicone Resin Render

EXAMPLE 5

A silicone resin render is produced by intensively mixing the following starting materials in the order indicated:

129 parts of water
25 parts of cellulose thickener (commercially available as "Tylose® H 6000 xp", Hoechst AG, Frankfurt)
2 parts of fungicide (commercially available as "Parmetol® DF 19" from Schülke & Mayr, D-Norderstedt)
2 parts of dispersant (commercially available as "Dispex® N 40", Krahn-Chemie GmbH, Hamburg)
70 parts of polymer dispersion (commercially available as "Acronal® S 716" from BASF AG, Ludwigshafen)
2 parts of film-forming aid (commercially available as "Texanol®" from Krahn-Chemie GmbH, Hamburg)
50 parts of silicone powder Ia
20 parts of titanium dioxide
698 parts of calcium carbonate and
2 parts of 25% strength sodium hydroxide solution Test specimens (disks having a diameter of 9 cm and a thickness of 6 mm) are subsequently produced from the silicone resin render obtained in this way and the water absorption is determined. For UV weathering, the render is applied to fibro-cement sheets. The water absorption of the render after storage in water for 24 hours is 4% by weight. After 1000 hours of Q-UV-B accelerated weathering, the render is absolutely free of cracks, has undergone no yellowing and displays an excellent beading effect toward water.

Hydrophobicization of Jointing Mortar

EXAMPLE 6

Jointing mortar without addition of hydrophobicizing agent (jointing mortar L) provided by the manufacturer (Dyckerhoff, D-Wiesbaden) was mixed with 0.5% of silicone powder Ib as hydrophobicizing agent (gives jointing mortar M). Subsequently, the two jointing mortars L and M were stored for 14 days at 50° C., then mixed with water and circular specimens were produced and stored for 14 days in a controlled atmosphere (23° C., 50% relative humidity). The capillary water absorption was subsequently determined. The results are summarized in Table 5.

TABLE 5

| Jointing Mortar | Hydrophobicizing Agent | $w_{24}$ Value $[kg/m^2h^{0.5}]$ |
|---|---|---|
| L | None | 1.55 |
| M | Silicone Powder I b | 0.09 |

Comparative Example 3

In a modification of Example 6, the jointing mortar without addition of hydrophobicizing agent (jointing mortar L) was mixed with 0.5% of a powder produced as described in GB-A-1217813 from 30 parts by weight of siloxane α, 5 parts by weight of water, 2 parts by weight of a polyvinyl alcohol containing 20% of vinyl acetate units and having a degree of polymerization of 2000 and 63 parts by weight of quicklime (CaO) (gives jointing mortar V3). The jointing mortar is subsequently examined as in Example 6. The result is shown in Table 6.

TABLE 6

| Jointing Mortar | Hydrophobicizing agent | w24 value $[kg/m^2h^{0.5}]$ |
|---|---|---|
| V3 | lime powder | 1.14 |

Result: The silicone powder Ib according to the invention has a significantly greater water-repellent action than lime powder.

Hydrophobicization of Concrete Compositions

EXAMPLE 7

The concrete compositions N are produced as follows: 1350 parts of standard sand are mixed with 450 parts of cement and 225 parts of water. Circular specimens are produced from the resulting composition and cured for 14 days at 23° C. and 50% relative humidity; the water absorption is then determined in accordance with ZTV-SIB (28 days' storage in water under pressure). The water absorption of the circular specimens N produced in this way is 6%, based on the total weight of the circular specimen. In a modification of the production of the concrete composition N, 0.4% of silicone powder Ib (gives concrete composition 0) or 0.4% of silicone powder Ih (gives concrete composition P), based on the weight of sand and cement, was used and the water absorption was determined. In all cases, the curing of the concrete was not hindered. The results are summarized in Table 7.

TABLE 7

| Concrete Composition | Hydrophobicizing Agent | Water Absorption (%) |
|---|---|---|
| N | None | 6 |
| O | Silicone Powder I b | 2.3 |
| P | Silicone Powder I h | 2.1 |

Hydrophobicization of Tile Adhesives

EXAMPLE 8

A pulverulent tile adhesive mixture Q is produced by mixing the following starting materials in the order indicated in a kitchen mixer (stirring speed:slow):
350 g of Portland cement PZ 35 F 120 g of quartz sand F 32 (Quarzwerke Frechen)
476 g of quartz sand No. 12 (Amberger Kaolinwerke)
50 g of RE 545 Z from WackerChemie GmbH
(redispersible dispersion powder based on a vinyl acetate-ethylene copolymer having a monomer ratio of 5:98).
4 g of methylhydroxyethylcellulose ether (MHEC).
500 g of water are subsequently added and stirring is continued. The water absorption of a test specimen produced from the mixture is determined after storage for 2 weeks at 23° C./50% relative humidity. The $w_{24}$ value is 0.87 kg/m$^2$h$^{0.5}$. In a modification of the production of the tile adhesive mixture Q, 5 g of silicone powder Ib are added in addition to the other ingredients, 500 g of water are then added and stirring is continued. Determination of the water absorption of a test specimen produced from this mixture gives a $w_{24}$ value of 0.15 kg/m$^2$h$^{0.5}$.

Hydrophobicization of a Powder Silicate Render

EXAMPLE 9

720 g of a commercial silicate dry render were mixed with 15 g of silicone powder Ih and subsequently admixed with 280 g of water. The test specimen obtained from the mixture was cured for 14 days at 23° C. and 50% relative humidity and the water absorption was subsequently determined. The $w_{24}$ value was 0.12 kg/m$^2$h$^{0.5}$. The specimen without silicone powder Ih had a $w_{24}$ value of 1.27.

Hydrophobicization of a Silicate Emulsion Paint

EXAMPLE 10

A commercial non-hydrophobicized silicate emulsion paint having a $w_{24}$ value of 1.3 kg/m$^2$h$^{0.5}$ is admixed with 1% of silicone powder IIb. The $w_{24}$ value determined subsequently was 0.16 kg/m$^2$h$^{0.5}$.

What is claimed is:

1. A building composition containing hydrophobicizing powders, said hydrophobicizing powders consisting essentially of
   A) pyrogenica silica or precipitated silica having BET surface area of at least 50 m$^2$/g as support material and
   B) a hydrophobicizing component which is liquid at 10° C. and comprises
      B1) one or more organosilicon compound(s) and, optionally,
      B2) solvent and/or
      B3) water and emulsifier,
with the proviso that the powders contain from 5 to 80% by weight of organosilicon compound, based on the total weight of the powder.

2. A building composition as claimed in claim 1, wherein the support material (A) is pyrogenic silica or precipitated silica having a BET surface area of at least 100 m$^2$/g.

3. A building composition as claimed in claim 1, wherein the organosilicon compound (B1) is selected from the group consisting of
   (B1.1) C$_1$–C$_{20}$-alkyl-C$_1$–C$_6$-alkoxysilanes;
   (B1.2) organosiloxanes containing groups selected from among hydrocarbon, hydroxyl, C$_1$–C$_6$-alkoxy and aminoalkyl groups;
   (B1.3) alkali metal siliconates; and mixtures thereof.

4. A building composition as claimed in claim 2, wherein the organosilicon compound (B1) is selected from the group consisting of
   (B1.1) C$_1$–C$_{20}$-alkyl-C$_1$–C$_6$-alkoxysilanes;
   (B1.2) organosiloxanes containing groups selected from among hydrocarbon, hydroxyl, C$_1$–C$_6$-alkoxy and aminoalkyl groups;
   (B1.3) alkali metal siliconates; and mixtures thereof.

5. A building composition as claimed in claim 1, wherein the organosiloxanes (B1.2) are built up of units of the formula (I)

where
R is a monovalent, unsubstituted or halogen-substituted, SiC-bonded C$_1$–C$_{20}$-hydrocarbon radical,
R$^1$ is a hydrogen atom or a monovalent C$_1$–C$_6$-alkyl radical,
R$^2$ is a monovalent, unsubstituted or halogen-substituted, SiC-bonded aminoalkyl radical having from 1 to 30 carbon atoms,
v is 0, 1, 2 or 3, on average from 0.3 to 2.0,
x is 0 or 1, on average from 0.0 to 1.0,
y is 0, 1, 2 or 3, on average from 0.0 to 1.5 and
z is 0, 1, 2 or 3, on average from 0.0 to 0.8,
with the proviso that the organosiloxanes (B1.2) have at least one unit of the formula (I) in which the sum of x, y and z is at least 1.

6. A building composition as claimed in claim 2, wherein the organosiloxanes (B1.2) are built up of units of the formula (I)

where
R is a monovalent, unsubstituted or halogen-substituted, SiC-bonded C$_1$–C$_{20}$-hydrocarbon radical,
R$^1$ is a hydrogen atom or a monovalent C$_1$–C$_6$-alkyl radical,
R$^2$ is a monovalent, unsubstituted or halogen-substituted, SiC-bonded aminoalkyl radical having from 1 to 30 carbon atoms,
v is 0, 1, 2 or 3, on average from 0.3 to 2.0,
x is 0 or 1, on average from 0.0 to 1.0,
y is 0, 1, 2 or 3, on average from 0.0 to 1.5 and
z is 0, 1, 2 or 3, on average from 0.0 to 0.8,
with the proviso that the organosiloxanes (B1.2) have at least one unit of the formula (I) in which the sum of x, y and z is at least 1.

7. A building composition as claimed in claim 3, wherein the organosiloxanes (B1.2) are built up of units of the formula (I)

where
R is a monovalent, unsubstituted or halogen-substituted, SiC-bonded C$_1$–C$_{20}$-hydrocarbon radical,
R$^1$ is a hydrogen atom or a monovalent C$_1$–C$_6$-alkyl radical,
R$^2$ is a monovalent, unsubstituted or halogen-substituted, SiC-bonded aminoalkyl radical having from 1 to 30 carbon atoms,
v is 0, 1, 2 or 3, on average from 0.3 to 2.0,
x is 0 or 1, on average from 0.0 to 1.0,
y is 0, 1, 2 or 3, on average from 0.0 to 1.5 and z is 0, 1, 2 or 3, on average from 0.0 to 0.8,
with the proviso that the organosiloxanes (B1.2) have at least one unit of the formula (I) in which the sum of x, y and z is at least 1.

8. A building composition as claimed in claim 4, wherein the organosiloxanes (B1.2) are built up of units of the formula (I)

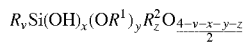   (I)

where
R is a monovalent, unsubstituted or halogen-substituted, SiC-bonded $C_1$–$C_{20}$-hydrocarbon radical,
$R^1$ is a hydrogen atom or a monovalent $C_1$–$C_6$alkyl radical,
$R^2$ is a monovalent, unsubstituted or halogen-substituted, SiC-bonded aminoalkyl radical having from 1 to 30 carbon atoms,
v is 0, 1, 2 or 3, on average from 0.3 to 2.0,
x is 0 or 1, on average from 0.0 to 1.0,
y is 0, 1, 2 or 3, on average from 0.0 to 1.5 and
z is 0, 1, 2 or 3, on average from 0.0 to 0.8,
with the proviso that the organosiloxanes (B1.2) have at least one unit of the formula (I) in which the sum of x, y and z is at least 1.

9. A building composition as claimed in claim 5 in which the organosiloxanes (B1.2) present are organosiloxanes (B1.2.1) which are liquid at 10° C., wherein
v has an average value of from 0.3 to 1.5,
x has an average value of from 0.0 to 0.2,
y has an average value of from 0.4 to 1.2 and
z is 0.

10. A building composition as claimed in claim 5 in which the organosiloxanes (B1.2) present are organosiloxanes (B1.2.2) which are solid at 10° C., wherein
v has an average value of from 0.3 to 1.5,
x has an average value of from 0.0 to 0.2,
y has an average value of from 0.4 to 1.2 and
z is 0.

11. A building composition as claimed in claim 5 in which the organosiloxanes (B1.2) present are organosiloxanes (B1.2.3) in which
v is on average from 1.6 to 2.0,
x is on average from 0.01 to 1.0,
y is on average from 0.0 to 0.2 and
z is 0.

12. A building composition as claimed in claim 11 wherein v is on average from 1.9 to 2.0.

13. A building composition as claimed in claim 5 in which the organosiloxanes (B1.2) present are organosiloxanes (B1.2.4) in which
v has an average value of from 0.3 to 1.9,
x has an average value of from 0.0 to 0.1,
y has an average value of from 0.0 to 1.0,
z has an average value of from 0.05 to 1.0.

14. A building composition as claimed in claim 13, wherein
v is on average from 0.9 to 1.8,
y is on average from 0.0 to 0.3, and
z is on average from 0.2 to 0.8.

15. A building composition as claimed in claim 1 which is a coating composition or a mineral building mixture for producing mineral building components.

16. A building composition as claimed in claim 3 which is a coating composition or a mineral building mixture for producing mineral building components.

17. A building composition as claimed in claim 4 which is a coating composition or a mineral building mixture for producing mineral building components.

18. A building composition as claimed in claim 5 which is a coating composition or a mineral building mixture for producing mineral building components.

19. A building composition as claimed in claim 6 which is a coating composition or a mineral building mixture for producing mineral building components.

20. A building composition as claimed in claim 14 which is a coating composition or a mineral building mixture for producing mineral building components.

21. The composition of claim 1 wherein all of said one or more organosilicon compound(s) are free of silicon-bonded hydrogen.

22. The composition of claim 3, wherein all of said one or more organosilicon compounds are free of silicon-bonded hydrogen.

23. The composition of claim 1, wherein said one or more organosilicon compounds are selected from the group consisting of organosiloxanes of units of the formula (I)

   (I)

where
R is a monovalent, unsubstituted or halogen-substituted, SiC-bonded $C_1$–$C_{20}$-hydrocarbon radical,
$R^1$ is a hydrogen atom or a monovalent $C_1$–$C_6$-alkyl radical,
$R^2$ is a monovalent, unsubstituted or halogen-substituted, SiC-bonded aminoalkyl radical having from 1 to 30 carbon atoms,
v is 0, 1, 2 or 3, on average from 0.3 to 2.0,
x is 0 or 1 on average from 0.0 to 1.0,
y is 0, 1, 2 or 3, on average from 0.0 to 1.5 and
z is 0, 1, 2 or 3, on average from 0.0 to 0.8,
with the proviso that the organosiloxanes (B1.2) have at least one unit of the formula (I) in which the sum of x, y and z is at least 1.

24. A building composition as claimed in claim 23 in which the organosiloxanes (B1.2) present are organosiloxanes (B1.2.2) which are solid at 10° C., wherein
v has an average value of from 0.3 to 1.5,
x has an average value of from 0.0 to 0.2,
y has an average value of from 0.4 to 1.2 and
z is 0.

25. A building composition as claimed in claim 23 in which the organosiloxanes (B1.2) present are organosiloxanes (B1.2.3) in which
v is on average from 1.6 to 2.0,
x is on average from 0.01 to 1.0,
y is on average from 0.0 to 0.2 and
z is 0.

* * * * *